United States Patent [19]

Lee et al.

[11] Patent Number: 6,049,539

[45] Date of Patent: Apr. 11, 2000

[54] ACCESS SYSTEM AND METHOD FOR PROVIDING INTERACTIVE ACCESS TO AN INFORMATION SOURCE THROUGH A NETWORKED DISTRIBUTION SYSTEM

[75] Inventors: Jae Hea Edward Lee, Bensalem, Pa.; Harold E. Herzig, Monmouth Junction, N.J.; Bruce D. Bauman, Mount Laurel, N.J.; Richard L. Booth, Teaneck, N.J.; Joseph E. Augenbraun, Princeton, N.J.

[73] Assignee: Worldgate Communications, Inc., Trevose, Pa.

[21] Appl. No.: 08/931,971

[22] Filed: Sep. 15, 1997

[51] Int. Cl.⁷ .................................................. H04L 12/56
[52] U.S. Cl. .......................... 370/355; 370/489; 370/522
[58] Field of Search ..................................... 370/352, 353, 370/354, 355, 356, 357, 360, 389, 392, 400, 401, 442, 485, 486, 498, 503, 496, 508, 509, 522, 527, 529, 489, 490; 395/200.47, 200.48, 200.49; 348/6, 7, 8, 9, 10, 12, 13, 14, 15, 16, 461, 464; 709/217, 218, 219

[56] References Cited

U.S. PATENT DOCUMENTS

| | | |
|---|---|---|
| 3,668,307 | 6/1972 | Face et al. . |
| 3,798,605 | 3/1974 | Feistel . |
| 3,803,491 | 4/1974 | Osborn . |
| 3,886,302 | 5/1975 | Kosco . |
| 3,924,187 | 12/1975 | Dormans . |
| 4,156,907 | 5/1979 | Rawlings et al. . |
| 4,251,691 | 2/1981 | Kakihara et al. . |
| 4,329,675 | 5/1982 | Van Hulle . |
| 4,388,645 | 6/1983 | Cox et al. . |
| 4,396,989 | 8/1983 | Fleming et al. . |
| 4,404,589 | 9/1983 | Wright, Jr. . |
| 4,439,759 | 3/1984 | Fleming et al. . |

(List continued on next page.)

FOREIGN PATENT DOCUMENTS

| | | |
|---|---|---|
| 61-073452 | 4/1986 | Japan . |
| PCT/US81/00414 | 3/1981 | WIPO . |

OTHER PUBLICATIONS

William Frezza, "The Broadband Solution —Metropolitan CATV Networks," Videotex'84, (Apr. 1984).

M.L. Ellis et al., "INDAX: An Operational Interactive Cabletext System," IEEE Journal on Selected Areas in Communications, vol. SAC–1 (No. 20, p. 285–294, (Feb. 1983).

Norman Toms, "An Integrated Network Using Fiber Optics (INFO) for the Distribution of Video, Data and Telephony in Rural Areas," IEEE Transactions on Communications, vol. COM–26 (No. 7), p. 1037–1045, (Jul. 1978).

Kenneth Rose, "Design of a Switched Broad–Band Communications Network for Interactive Services," IEEE Transactions on Communications, vol. COM–23 (No. 1), p. 49–55, (Jan. 1975).

*Primary Examiner*—Chi H. Pham
*Assistant Examiner*—Kwang B. Yao
*Attorney, Agent, or Firm*—Jones, Tullar & Cooper

[57] ABSTRACT

An access system and method provides interactive access to an information source, such as the Internet, through a networked distribution system, such as a television distribution system. Each user in the television distribution system can access the Internet through an associated terminal by sending commands through an upstream channel to a headend server which is interfaced between a television network headend and an Internet Service Provider(ISP). The headend server manages all Internet information requests from the terminals by forwarding the requests to the ISP and receiving the requested information therefrom. An Internet Protocol (IP) address is assigned only to the headend server which keeps track of the terminals requesting information by means of terminal identification numbers or codes associated with each request. The headend server also maintains a plurality of Internet browser applications active at all times to insure that a terminal requesting Internet access can be immediately interfaced to the ISP through one of the active browser applications. Each of the downstream television signals includes a vertical synchronization signal that is preferably employed to generate a framing signal for synchronizing upstream transmission of the data packets comprising the information requests from the terminals.

25 Claims, 10 Drawing Sheets

U.S. PATENT DOCUMENTS

| | | |
|---|---|---|
| 4,439,761 | 3/1984 | Fleming et al. . |
| 4,454,593 | 6/1984 | Fleming et al. . |
| 4,461,032 | 7/1984 | Skerlos . |
| 4,475,123 | 10/1984 | Dumbauld et al. . |
| 4,484,218 | 11/1984 | Boland et al. . |
| 4,491,983 | 1/1985 | Pinnow et al. . |
| 4,545,075 | 10/1985 | Miller et al. . |
| 5,818,935 | 10/1998 | Maa ............................................ 380/20 |
| 5,822,324 | 10/1998 | Kostresti et al. ........................ 370/487 |
| 5,832,223 | 11/1998 | Hara et al. . |
| 5,850,218 | 12/1998 | Lajoie et al. ............................ 345/327 |
| 4,553,161 | 11/1985 | Citta ........................................ 348/10 |
| 4,623,920 | 11/1986 | Dufresne et al. . |
| 4,625,235 | 11/1986 | Watson . |
| 4,638,356 | 1/1987 | Frezza . |
| 4,712,239 | 12/1987 | Frezza et al. . |
| 4,734,764 | 3/1988 | Pocock et al. . |
| 4,757,460 | 7/1988 | Bione et al. . |
| 4,792,948 | 12/1988 | Hangen et al. . |
| 4,862,268 | 8/1989 | Campbell et al. . |
| 4,972,463 | 11/1990 | Danielson et al. . |
| 4,982,430 | 1/1991 | Frezza et al. . |
| 5,093,718 | 3/1992 | Hoarty et al. . |
| 5,124,980 | 6/1992 | Maki . |
| 5,142,532 | 8/1992 | Adams . |
| 5,220,420 | 6/1993 | Hoarty et al. . |
| 5,245,429 | 9/1993 | Virginio et al. . |
| 5,347,304 | 9/1994 | Moura et al. . |
| 5,359,367 | 10/1994 | Stockill . |
| 5,375,160 | 12/1994 | Guidon et al. . |
| 5,412,720 | 5/1995 | Hoarty . |
| 5,414,773 | 5/1995 | Handelman . |
| 5,418,559 | 5/1995 | Blahut . |
| 5,421,030 | 5/1995 | Baran . |
| 5,425,027 | 6/1995 | Baran . |
| 5,446,918 | 8/1995 | Lamy . |
| 5,481,542 | 1/1996 | Logston et al. . |
| 5,488,412 | 1/1996 | Majeti et al. . |
| 5,490,208 | 2/1996 | Remillard . |
| 5,499,241 | 3/1996 | Thompson et al. . |
| 5,526,034 | 6/1996 | Hoarty et al. . |
| 5,550,578 | 8/1996 | Hoarty et al. . |
| 5,566,306 | 10/1996 | Ishida . |
| 5,586,121 | 12/1996 | Moura et al. . |
| 5,589,872 | 12/1996 | Martinez . |
| 5,594,490 | 1/1997 | Dawson et al. ............................ 348/6 |
| 5,594,726 | 1/1997 | Thompson et al. . |
| 5,608,446 | 3/1997 | Carr et al. . |
| 5,612,730 | 3/1997 | Lewis . |
| 5,630,119 | 5/1997 | Aristides et al. . |
| 5,654,748 | 8/1997 | Matthews, III . |
| 5,659,350 | 8/1997 | Hendricks et al. . |
| 5,689,799 | 11/1997 | Dougherty et al. . |
| 5,708,961 | 1/1998 | Hylton et al. . |
| 5,729,549 | 3/1998 | Kostreski et al. ...................... 370/522 |
| 5,774,664 | 6/1998 | Hidary et al. ...................... 395/200.48 |
| 5,774,666 | 6/1998 | Portuesi ............................ 395/200.48 |
| 5,778,181 | 7/1998 | Hidary et al. . |
| 5,784,597 | 7/1998 | Chiu et al. ............................... 713/401 |
| 5,818,438 | 10/1998 | Howe et al. . |

ACCESS SYSTEM AND METHOD FOR PROVIDING INTERACTIVE ACCESS TO AN INFORMATION SOURCE THROUGH A NETWORKED DISTRIBUTION SYSTEM

FIELD OF THE INVENTION

The present invention relates generally to an access system and method for providing interactive access to an information source without the need to acquire expensive, difficult to use computer hardware and software. More particularly, the present invention relates to a system and method for providing access to an information source, such as the Internet, through a networked distribution system, such as a television distribution system.

BACKGROUND OF THE INVENTION

As is well-known, the "Internet" is a world-wide interconnected network of computers, access to which may be had for purposes of communication, research, entertainment and the like. However, such access normally requires the use of relatively expensive and complex equipment including a personal computer and related hardware and software. Further, using a personal computer and related equipment requires a relatively high degree of technical sophistication and commitment. Accordingly, even if a user can afford to buy a system including a personal computer, a printer, a modem, cables and other necessary related gear, the user must properly install, connect and configure each device, must learn how to operate each device, and must update hardware and ware as necessary to maintain the system. Accordingly, a need exists for an access system and method that is relatively inexpensive to the user, that requires only a minimum of technical sophistication and commitment, and is relatively easy to use.

SUMMARY OF THE INVENTION

The present invention satisfies the foregoing need by providing a system and method for accessing an information source, such as the Internet, through a networked distribution system, particularly, a cable television distribution system. Conventional television distribution systems include a television distribution network which is interfaced through communications links (e.g., coaxial cables, optical fibers, radio and satellite wireless links, etc.) to a plurality of user televisions. Typically, each user television is connected to a set top converter box or terminal which is interfaced between the communication link and the television for receiving and decoding the television signals from the distribution network.

In the television distribution system employed in the preferred embodiment of the present invention, at least one upstream communication channel is provided between each user and the distribution network which enables the users to communicate in real-time therewith. In addition, the television distribution network is interfaced to an information source, such as the Internet, by means of a headend server and router. A service provider, such as an Internet service provider (ISP), is typically employed to access the Internet, although the Internet may also be accessed directly. In the case where the information source is the Internet, each user can access the Internet by sending access commands and information requests through the upstream communication channel to the headend server. The headend server then forwards the information requests from each user to the ISP. After the ISP retrieves the requested information, it is sent to the headend server which then downloads it through one of a plurality of downstream television signal channels to the requesting user.

In the preferred embodiment of the present invention, information requested from the ISP can be downloaded to each user's set top terminal. In one embodiment of the present invention, this is accomplished by inserting the information into the vertical blanking interval (VBI) of the analog television signals which are transmitted concurrently by the television distribution network on the downstream channels. Alternatively, the information can be digitally encoded and packetized along with control information. Depending on the type of television distribution network, this packetized data is then used to modulate a selected carrier which is transmitted on the downstream channels, or the data is sent directly without further modulation. In a cable television system, this insertion or encoding takes place at the cable or network headend. Accordingly, each set top converter box or terminal includes an extractor or decoder, and a terminal processor for extracting the information, and formatting it for display on the user's television.

A time division multiple access (TDMA) communication scheme is preferably employed in which the data transmitted through the upstream channels is packetized, and inserted into slots in the channels. This facilitates transmission of data from multiple users through a single one of the upstream channels. To provide proper synchronization of the upstream channel data to be transmitted from each user terminal to the distribution network, the terminal processor in each user terminal detects a vertical synchronization signal which is present in the downstream television signals, and employs this signal to generate a TDMA framing signal for synchronizing transmission of the upstream data. In another embodiment, the upstream data is packetized, but sent without a framing signal. Rather, the terminal processor continues to re-send such data until such time as it receives an acknowledgment from the headend indicating that it has been received.

The single headend server therefore processes all Internet access and information requests from each of the users connected to the television distribution network. To manage this arrangement, the present invention employs two notable features. First, to insure that any user can log-in quickly to the Internet, the headend server maintains a plurality of available Internet browser applications actively running at any given moment so that a user requesting Internet access can be immediately connected thereto through one of these available active browsers. This drastically reduces the log-in time normally required for opening the browser application and accessing the Internet. To implement this feature of the invention, the headend server is programmed to maintain open, at any given moment, some number of browser applications in excess of those currently being used by users. The headend server monitors the number of available active browsers, and when the number drops below some predetermined number, the headend server causes additional browser applications to be opened.

Another significant feature of the present invention regards the assignment of Internet Protocol (IP) addresses. In conventional Internet access systems, IP addresses are assigned either permanently or temporarily to each networked machine to facilitate communication between the Internet and the user. In the present invention, it is envisioned that a very large number (e.g., 1000) of television users would have the ability to access the Internet through a single headend server interfaced to the television distribution network. With this arrangement, it would be prohibitive to assign an IP address to each user. The present invention overcomes this problem by assigning a permanent ID address only to the headend servers which transmit all of the Internet information requests to, and receive the requested information from, the Internet through the ISP. The headend server must therefore include some means for identifying the user making each request, as well as the user to which requested information is to be transmitted. This is accomplished by providing each user terminal with a terminal identification number or code which is transmitted with each access or information request in conjunction with a session ID. Using the identification number or code, the headend server can keep track of which user requested the Internet information when it is received by the headend server from the Internet through the ISP.

BRIEF DESCRIPTION OF THE DRAWINGS

The features and advantages of the present invention will become apparent from the following detailed description of preferred embodiments thereof, taken in conjunction with the in accompanying drawings in which.

DETAILED DESCRIPTION OF THE PREFERRED EMBODIMENTS

Figure 1:
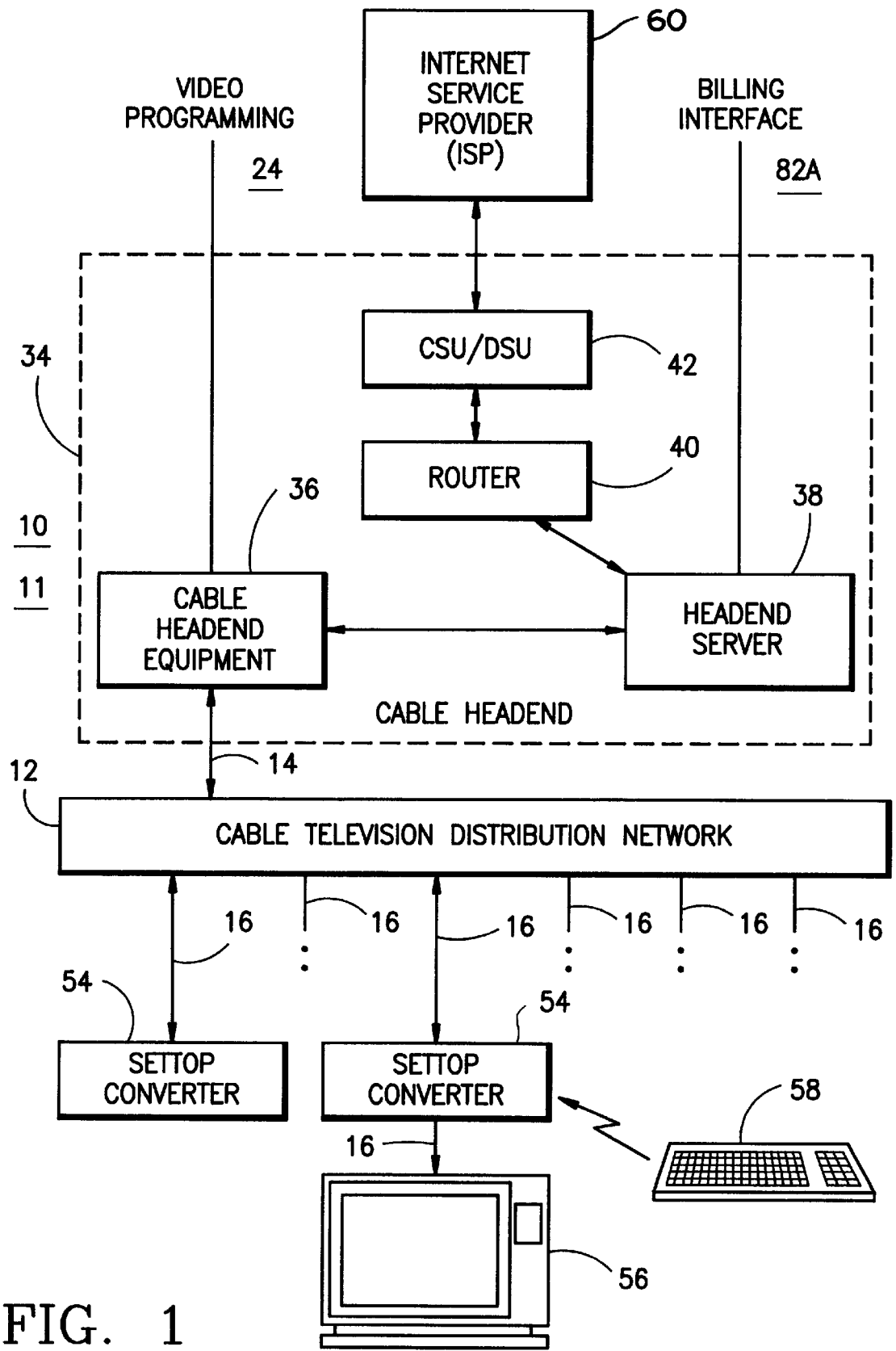
FIG. 1 is a block diagram of the architecture of an access system and a television distribution system constructed in accordance with a preferred embodiment of the present invention.

Referring to the drawings in detail, wherein like numerals are used to indicate like elements throughout, there is shown in FIG. 1 a preferred embodiment of an access system 10 for providing interactive access to an information source through a television distribution system 11. As illustrated, the components of the access system 10 and of the television distribution system 11 are by necessity commingled. Preferably, the television distribution system 11 is a cable television distribution system 11 comprising a nodal television distribution network 12 of branched fiber-optic and/or coaxial cable lines. As one skilled in the art will appreciate, such a television distribution system 11 and network 12 are well-known and are used extensively by cable television service providers throughout the United States. However, one skilled in the art will also recognize that other types of networked distribution systems may be employed without departing from the spirit and scope of the present invention. Such other types of networked distribution systems include but are not limited to orbiting satellite systems, terrestrial wireless cable systems and the like.

The television distribution network 12 has a network headend 14 and a plurality of terminal ends 16. As should be understood, and referring now to FIGS. 2A and 2B, the network 12 has a frequency spectrum which is divided into a plurality of RF-modulated downstream channels 20 (FIG. 2A) and a plurality of RF-modulated upstream channels 22 (FIG. 2B), where each downstream channel 20 carries one or more television transmissions 24 from the network headend 14 to the terminal ends 16, and each upstream channel carries data transmissions 26 from the terminal ends 16 to the network headend 14.

Figure 2A:
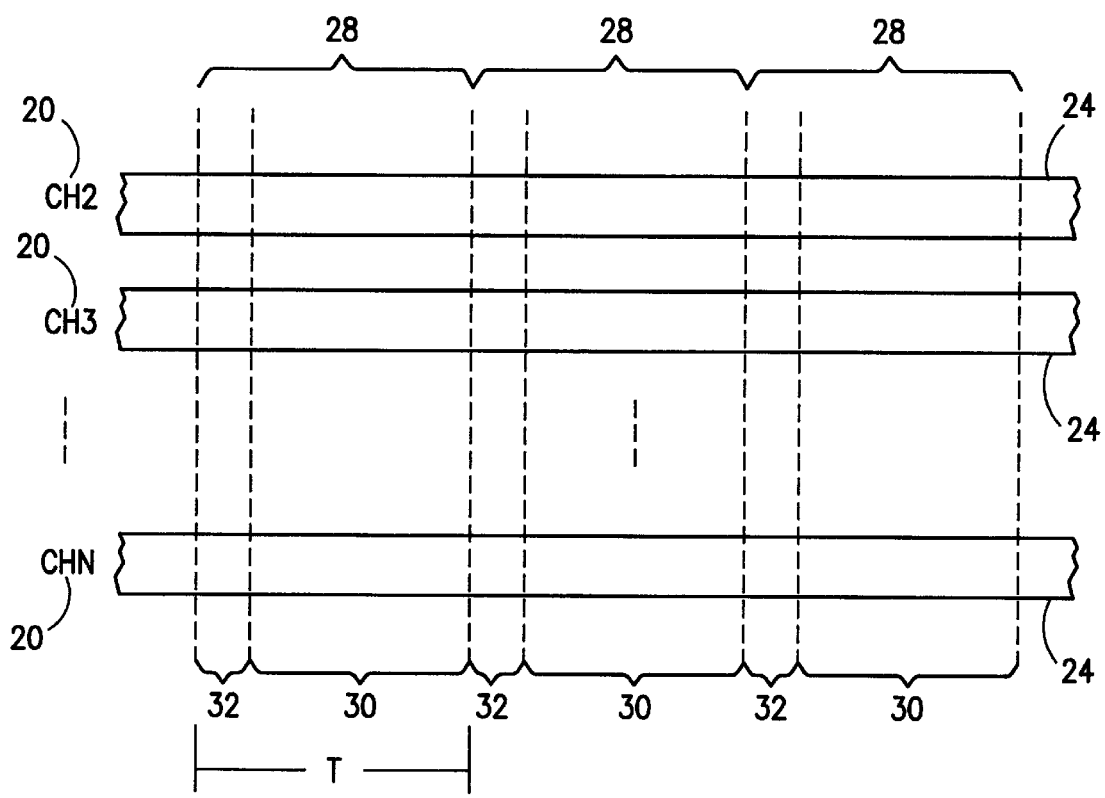
FIGS. 2A and 2B are timing diagrams of downstream and upstream channels, respectively, of the television distribution system of FIG. 1.

As illustrated in FIG. 2A, each television transmission 24 on a respective downstream channel 20 according to a first embodiment of the present invention includes a plurality of sequentially transmitted picture fields 28, where each transmitted picture field 28 includes a picture interval 30 corresponding to a transmission of pixelated picture data, and a blank interval or vertical blanking interval 32 corresponding to a transmission of no pixelated picture data. As is known, the blank interval 32 is necessary due to constraints imposed by electron gun display devices. More particularly, most television display devices employ an electron gun and a phosphorescent screen to display a television transmission 24, and a picture from a transmitted picture field 28 is created on the screen by focusing the electron gun to fire electrons onto the screen in a series of horizontal lines sequentially applied from the top of the screen to the bottom. Accordingly, after the end of a first picture field 28, a vertical blanking interval 32 is necessary at the beginning of a second picture field 28 to allow time to retrace the electron gun from the bottom of the screen to the top. As is known, each transmitted picture field 28 also includes a horizontal blanking interval between each transmitted horizontal line to allow time to retrace the electron gun from the end of one line to the beginning of another line. As is also known, each picture field 28 in the USA broadcasting convention is 1/60th of a second in temporal length T, and two picture fields 28 combine to form one picture frame.

In another embodiment of the present invention, the television transmissions are digitized, and include a plurality of packetized digital data streams containing the required video, audio and control information which is either sent directly, or is modulated for downstream transmission. It is understood that such techniques and apparatus for packetizing, modulating and transmitting digital data streams are well known to those of skill in the art, and need not be discussed further.

As illustrated in FIG. 1, the network headend 14 of the television distribution system 11 is connected to a cable headend 34, and the cable headend 34 includes cable headend equipment or headend distribution equipment 36 and a headend server 38. As will be discussed in greater detail below, the headend server 38 communicates with an information source through a router 40 and a channel service unit/data service unit (CSU/DSU) 42.

Figure 4:
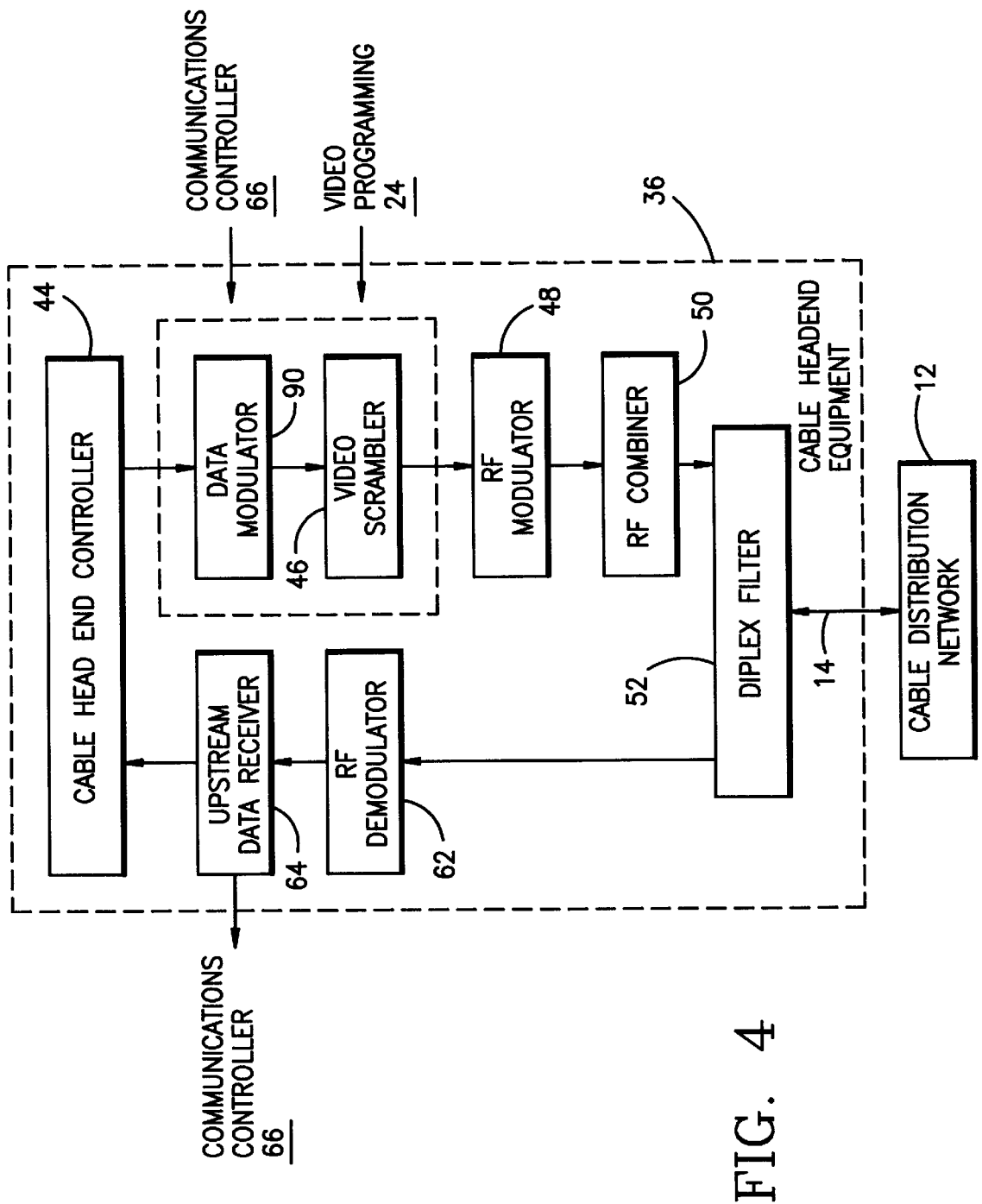
FIG. 4 is a block diagram of the cable headend equipment shown in FIG. 1.

Referring now to FIG. 4, the cable headend equipment 36 includes a conventional cable network headend controller 44 for controlling the distribution of the television transmissions 24 over the respective downstream channels 20 of the television distribution network 12. For each downstream channel 20, the cable headend equipment 36 may also include an optional video scrambler 46 for receiving the television transmissions 24 in the form of video programming and scrambling the video programming (only one video scrambler 46 is shown in FIG. 4). An RF modulator 48 is included in the cable headend equipment for each downstream channel 20 to modulate the respective television transmission 24 to the downstream channel 20 frequency (only one RF modulator 48 is shown in FIG. 4), and a single RF combiner 50 receives the outputs from all RF modulators 48 and combines such outputs to form a single signal. The single signal output from the RF combiner 50 is fed to a diplex filter 52 and then to the network headend 14. As should be understood, the diplex filter 52 also receives the upstream data transmissions 26 on the upstream channels 22 and separates out such upstream data transmissions 26 to be sent further upstream.

Referring again to FIG. 1, the television distribution system 11 also has a plurality of set top converters or terminals 54, each terminal 54 being interfaced to a terminal end 16 of the television distribution network 12 for receiving the television transmissions 24 over the respective downstream channels 20. As should be understood, each terminal 54 facilitates selection of the downstream channels 20 and is interfaced to a display device 56 for displaying the television transmission 24 carried on the selected downstream channel 20. Typically, the display device 56 is a tunable television set, although one skilled in the art will recognize that a non-tunable television monitor may also be employed.

Figure 6:
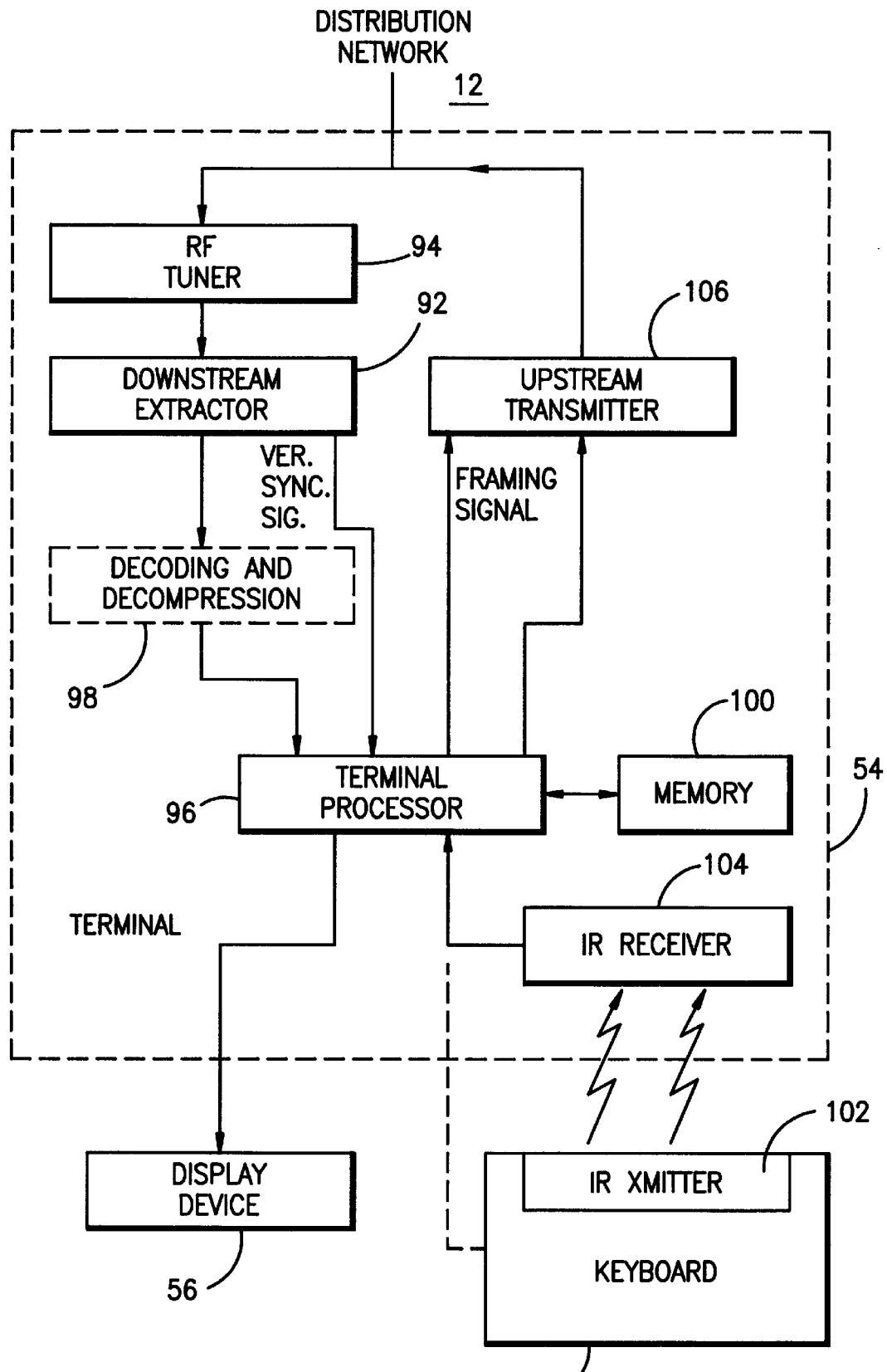
FIG. 6 is a block diagram of one of the set top converters or terminals shown in FIG. 1.

With the television distribution system 11 as thus far described, the access system 10 will now be discussed. Still referring to FIG. 1, the access system 10 includes an input device 58 associated with one of the terminals 54 for inputting therein a command for an information source. As illustrated in FIG. 6, the command input into the terminal 54 by the inputting device 58 is transmitted by an upstream transmitter 106 on an RF-modulated upstream channel 22 of the television distribution network 12 from the terminal 54 to the cable headend equipment 36.

Preferably, the information source is the well-known Internet communications network, and the headend server 38 communicates therewith through a provider such an Internet service provider (ISP) 60. However, it will be understood that the information source may be a local information source at the cable headend 34, an E-mail interchange, a "chat room" interchange, the application server 68 itself, or the like.

Figure 3:
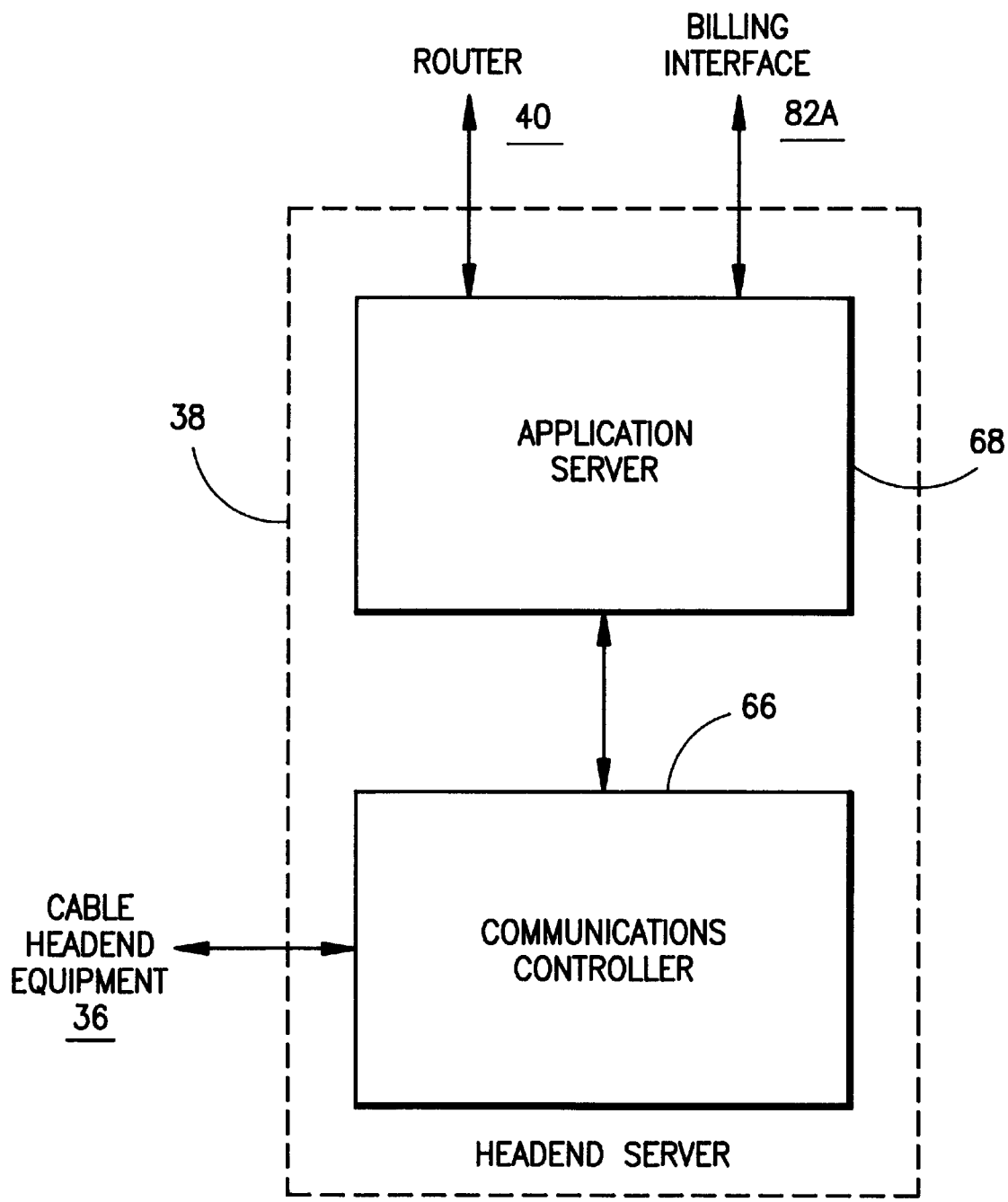
FIG. 3 is a block diagram of the headend server shown in FIG. 1.

Referring again to FIG. 4, all of the upstream channels 22 are received from the network headend 14 of the cable distribution network 12 at the diplex filter 52, are separated by the diplex filter 52 from the downstream channels 20, and are forwarded to RF demodulators 62, one RF demodulator 62 for each upstream channel 22 (only one RF demodulator 62 is shown in FIG. 4). Accordingly, the RF-modulated upstream channel 22 having the transmitted command is demodulated, and the command is forwarded to an upstream data receiver 64 which in turn forwards the received command to the headend server 38 (as illustrated in FIGS. 1 and 3). Alternatively, although not illustrated, the present invention can use alternative upstream channels, such as telephone and/or non-cable RF broadcasts. With such alternatives, the transmitted commands can be routed either directly to the upstream data receiver 64, or through the RF demodulator 62 to the upstream data receiver 64, as required.

The headend server 38 is associated with the cable headend equipment 36 and is interfaced to the ISP 60.

Accordingly, the headend server 38 transmits a command based on the forwarded command from the upstream receiver 64 to the ISP 60 by way of the router 40 and the CSU/DSU 42. More specifically, and referring now to FIG. 3, the headend server 38 is preferably partitioned into a communications controller 66 and an application server 68. The command from the upstream receiver 64 is received by the communications controller 66 and is then forwarded to the application server 68. As will be discussed more fully below, the communications controller 66 packetizes downstream data, de-packetizes upstream data, handles session requests from the terminals 54, and otherwise performs functions necessary to maintain communications between the application server 68 and the terminals 54.

Figure 5:
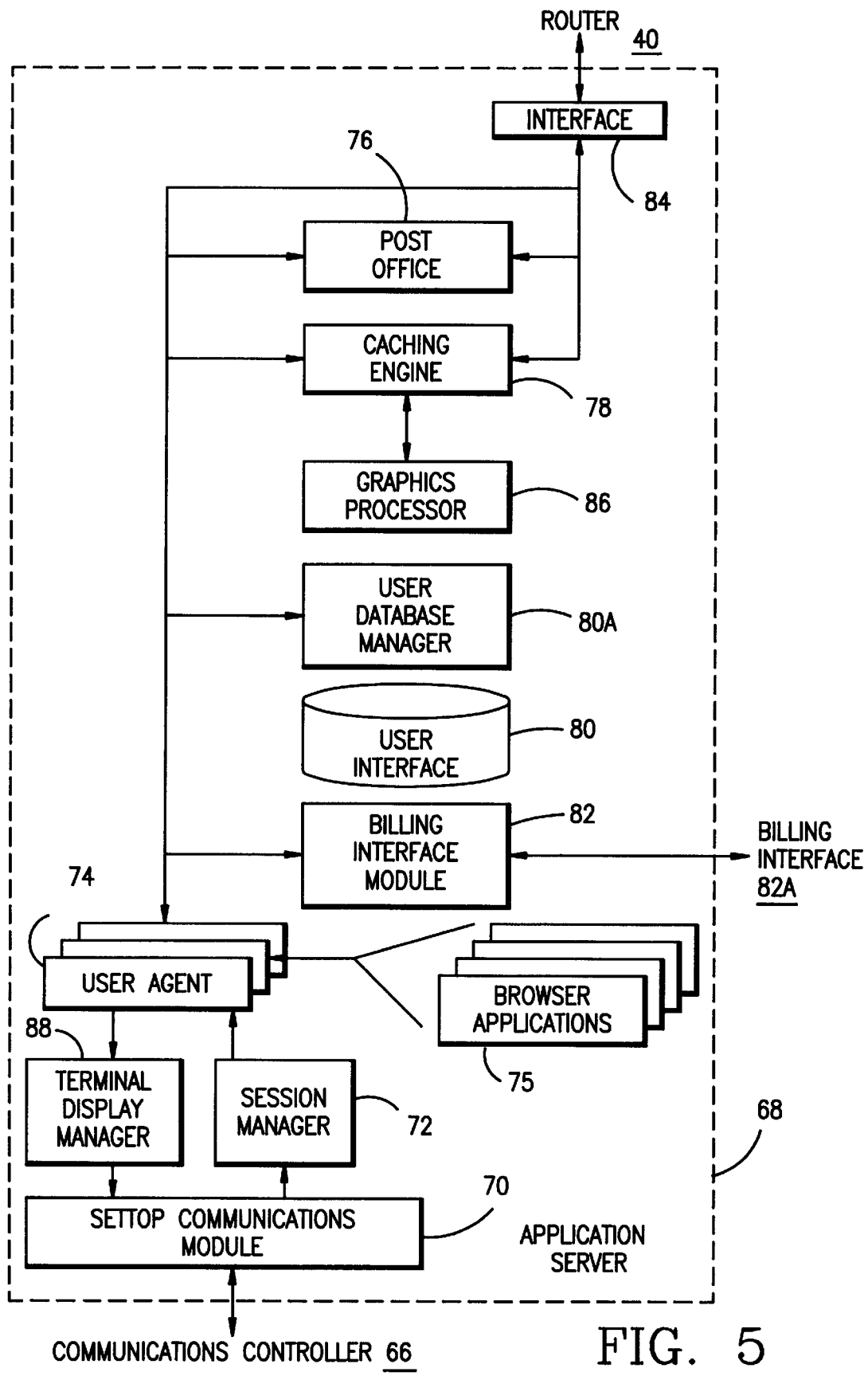
FIG. 5 is a block diagram of the application server shown in FIG. 3.

Referring now to FIG. 5, the application server 68 includes a set top communications module 70 in communication with the communications controller 66 for interfacing the application server 68 to the communications controller 66. The received command from the communications controller 66 is forwarded to the set top communications module 70 and is then forwarded to a session manager 72. As should be understood, the session manager 72 manages multiple sessions from multiple set top terminals 54, and therefore maintains an association between the received command and the terminal 54 that originated the received command. More particularly, as will be discussed in greater detail in conjunction with FIG. 9, each command or information request received by the session manager 72 includes an identification number or code for identifying which of the terminals 54 sent the command or request. The session manager 72 keeps track of this information so that when requested information is received from the ISP 60, the session manager 72 will know to which of the terminals 54 the information should be downloaded. It should be noted that the ISP 60 communicates only with application server 68 within the headend server 38, and thus does not communicate directly with any of the set top terminals 54, This is an important feature of the present invention because it eliminates the need to assign Internet Protocol (IP) addresses to each of the set top terminals 54. Instead, the system 10 requires assignment of only a single IP address to the application server 68 for managing all of the Internet access and information requests from each of the set top terminals 54.

After a command is received from one of the terminals 54, the session manager 72 forwards it to one of several user agents 74, depending on the command and the current application. The user agents 74 include a plurality of browsers 75 for browsing through the ISP 60, an E-mail agent for facilitating E-mail through the ISP 60, a chat agent for facilitating on-line chat sessions, and the like.

In response to a received command, a user agent 74 issues one or more further commands based on the received command in a format understandable by the ISP 60, and the issued commands are forwarded to the ISP 60 by way of a post office 76, a caching engine 78, or by bypassing the post office 76 and the caching engine 78. As should be understood, the post office 76 facilitates the sending and receiving of E-mail, and the caching engine 78 stores and forwards traffic in either direction. In addition, the caching engine 78 may keep track of issued commands and store certain data if requested on a regular basis. As should also be understood, the post office 76 and the caching engine 78 may be bypassed when not needed, e.g. during an on-line chat session. As with user agents, post offices and caching engines are well-known and therefore need not be described here in more detail.

Another significant feature of the present invention is the provision of a plurality of the browsers 75 in the application server 68. The session manager 72 controls activation of the browsers 75 such that at any given moment, several of the browsers 75 are activated which are not being used by any of the users. The purpose of this arrangement is to insure that a user can be connected to the Internet without login delays which normally occur during opening of a browser application. Thus, when the application server 68 receives a request from a user for connection to the Internet, the session manager 72 immediately establishes the connection through one of the available active browsers 75. When the user sends a request to terminate the Internet session, the session manager 72 then causes that one of the browser applications 75 to be closed.

The session manager 72 is programmed to monitor the number of available active browsers 75. As users are connected to the Internet through the browsers 75, the number of available active browsers decreases. Once this number reaches a predetermined minimum, e.g. 3, then the session manager 72 causes a predetermined number, e.g. 5, of the browsers 75 to be reactivated to insure that an active browser will always be available when an Internet access request is received from a user.

Preferably, the application server 68 also includes a user database manager 80A and an associated user database 80 for managing access system user information. As should be understood, such information includes information on each user, certain characteristics and attributes associated with each user, information on frequently accessed information for each user, and the like. The application server 68 may also have a billing interface module 82 associated with a billing interface 82A for purposes of billing users for use of the access system 10. As one skilled in the art will recognize, the billing interface 82A can connect with any of a plurality of known accounting systems for purposes of billing, including the accounting system for billing use of the television distribution system 11.

Preferably, the application server 68 includes an interface 84 for allowing the application server 68 to communicate with the information source by way of whatever protocol the information source may be expecting. For example, if the information source is the Internet, and the ISP 60 is employed, the protocol would preferably be the TCP/IP (transmission control protocol/Internet protocol) protocol normally used to communicate on the Internet. However, depending on the information sources, one skilled in the art will recognize that other protocols may be employed without departing from the spirit and scope of the present invention.

Referring again to FIG. 1, the interface 84 in FIG. 5 preferably communicates with the ISP 60 by way of the router 40 and the CSU/DSU 42 associated with the cable headend 34. As should be understood, the router 40 is connected to the interface 84 for routing/pipelining data between the ISP 60 and the interface 84, and the CSU/DSU 42 is a service unit for interfacing the router 40 to the ISP 60. Both routers and CSU/DSUs are well-known and therefore further description is not necessary. Moreover, one skilled in the art will recognize that other methods of interfacing the ISP 60 to the headend server 38 may be employed without departing from the spirit and scope of the present invention. Further, one skilled in the art will also recognize that not all commands need be forwarded to the ISP 60. For example, if requested information is already available in the application server 68 at the caching engine 78 (a highly requested Internet home page, for example), the ISP 60 need not be communicated with to procure the requested information. Likewise, if the command is a message from a first terminal 54 to a second terminal 54 by way of the headend server 38 (as discussed below), no communication need be had with the ISP 60.

Once the ISP 60 has received a command, the ISP 60 preferably processes the command to produce information in response thereto. The produced information is transmitted by the ISP 60 to the headend server 38, and must then be sent to the terminal 54 from which the corresponding command originated. Accordingly, and as illustrated in FIG. 5, the information from the ISP 60 is received in the application server 68 by way of the interface 84 and is forwarded through the post office 76 and/or the caching engine 78 to the appropriate user agent 74.

As should be recognized, depending upon the information source, the information from the information source may not be in a form that is compatible for display on the display device 56 associated with the terminal 54. More particularly, if the information source is the Internet and the ISP 60 is employed to access information therefrom, the information will likely include graphics in a first graphic form (e.g. a screen having 640 pixels×480 pixels×256 colors) while the terminal 54 and display device 56 are likely expecting the information to be in a second graphics form (e.g. 320 pixels×200 pixels×16 colors). Accordingly, the graphics portion of the information must be converted by a graphics processor 86 in communication with the caching engine 78. The operation of a graphics processor in converting graphic data from one form to another is well-known and need not be further described here.

The information from the ISP 60 is forwarded by the user agent 74 to a terminal display manager 88. Preferably, the terminal display manager 88 is designed to minimize the actual amount of information that must be transmitted to the terminal 54. Accordingly, it is preferable that the terminal display manager 88 render screens at the application server 68 for display at the appropriate terminal 54, that the terminal display manager 88 retain information on the screen currently being displayed at the appropriate terminal 54, and that the terminal display manager 88 transmit only the information necessary to refresh portions of a screen that are to be changed. The process of rendering screens for display by a screen renderer or the like is well-known and need not be further described here.

As should be understood, transmitting only refresh information can greatly reduce the amount of downstream information that must be sent to the terminal 54, especially if only a small change to a screen is necessary. Preferably, the terminal 54 is programmed to operate based on such refresh information.

The refresh information from the terminal display manager 88 and other information from the application server 68 is forwarded to the communications controller 66 by way of the set top communication module 70. Referring again to FIG. 4, the communications controller 66 receives the forwarded information and in turn forwards such information to a data modulator 90. The data modulator 90 can be, for example, a vertical blanking interval (VBI) inserter, or a horizontal blanking interval (HBI) inserter, or a QAM modulator, with or without an accompanying RF modulator. As should be understood, one of the data modulators 90 is provided for each downstream channel 20 (only one modulator 90 is shown in FIG. 4) to insert sequential portions of the forwarded information from the communications controller 66 in the television transmissions 24 of the respective downstream channel 20.

Each data modulator 90 is interposed in a downstream flow between the cable headend controller 44 and a respective diplex filter 52. In addition, the downstream path may also include a video scrambler 46, RF modulator 48 and RF combiner 50 in accordance with techniques and systems known to those skilled in the art. As is appreciated by those skilled in the art, different data modulation schemes and techniques may be employed without departing from the spirit and scope of the present invention.

Referring now to FIG. 6, the terminal 54 includes an RF tuner 94 and a downstream data extractor 92. More particularly, the RF tuner 94 is preset to tune in and demodulate the downstream channel 20 having the television transmission 24 with the inserted information, and the data extractor 92 extracts the inserted sequential portions of the inserted information from the blank intervals 32 of the sequential picture fields 28 of the demodulated television transmission 24. The extracted information is then forwarded to a terminal processor 96.

Assuming the equivalent baud rate of each blank line in a VBI is about 12.5 K, and assuming eight lines of each VBI are employed by the access system 10 of the preferred embodiment of the present invention, a 100K equivalent baud rate is achieved using the VBI insertion technique for the information transfer. For even greater data rates, it will be understood that the information could also be interspersed throughout the video and audio streams.

Preferably, the inserted information sent downstream from the cable headend equipment 36 is coded and/or compressed by the terminal display manager 88 using well-known techniques to minimize transmission time. Preferably, the processor 96 includes software for performing the function of decoding and decompressing the coded and/or compressed refresh information. Alternatively, the terminal 54 may include a de-coding and/or decompression module 98 interposed between the data extractor 92 and the processor 96 for decoding and decompressing the coded and/or compressed refresh information before such information is presented to the terminal processor 96. As illustrated in FIG. 6, the terminal processor 96 may be associated with a memory 100 to facilitate the various processing functions performed thereby.

Preferably, the terminal processor 96 and the memory 100 produce display information from the extracted information, and the display information is displayed on the display device 56. Preferably, the extracted information includes the screens rendered by the terminal display manager 88 of the application server 68.

Preferably, and as illustrated in FIGS. 1 and 6, the input device 58 for inputting the commands into the terminal 54 is a computer-style keyboard 58. Accordingly, a user of the access system 10 can type word commands, E-mail and the like. Also, the keyboard 58 preferably includes a mouse device for moving a graphic pointer displayed on the display device 56. Preferably, the mouse pointer image is rendered by the terminal processor 96 in the terminal(set top converter) 54 for improved response time. An infrared (IR) transmitter 102 is provided for transmitting keystroke signals from the keyboard 58 in the form of an IR transmission to an IR receiver 104 for receiving the IR transmissions from the keyboard 58 and for forwarding signals corresponding to the transmitted keystroke signals to the terminal processor 96. However, the keyboard 58 may be tethered to the terminal 54 without departing from the spirit and scope of the present invention.

Alternatively, the keyboard 58 may be replaced with a remote control device having directional buttons and an execute button. Such remote control devices are of the type typically employed with a terminal 54 in a television distribution system 11 for inputting into the terminal 54 a selection of one of a plurality of downstream channels 20 for display on the display device 56. Regardless of the source of the command, the terminal 54 transmits the command by way of the upstream transmitter 106 as a data transmission 26 on one of the upstream channels 22 of the television distribution network 12.

In the access system 10 of the preferred embodiment of the present system, the headend server 38 is a centralized processor for each of the plurality of the terminals 54. Accordingly, the upstream receiver 64 may receive a plurality of inputted commands from a plurality of the terminals 54 on one or more of the upstream channels 22 of the distribution network 12, and then forward the respective received commands to the headend server 38. As should now be understood, the headend server 38 transmits commands based on the respective forwarded commands to the ISP 60, and the ISP 60 transmits the information to the headend server 38 in response to the respective forwarded commands. The data modulator 90 receives information based on the respective transmitted information from the headend server 38 and inserts sequential portions of the received information into at least one of the television transmissions 24, and each of the data extractors 92 in the respective terminals 54 extracts the respective inserted sequential portions of the information.

Preferably, the headend server 38 acting as a centralized processor for each of the plurality of the terminals 54 allows for terminal-to-terminal communications, at least among the terminals 54 in the television distribution system 11. As should be understood, in such communication, a message is sent from a first of the terminals 54 to the headend server 38 and is then routed by the headend server 38 to a second of the terminals 54, thereby bypassing the ISP 60. Preferably, the message is an e-mail message or is a message transmitted during a chat session or some other application that provides peer-to-peer communications.

As will be discussed further in conjunction with FIGS. 7–10F, the transmission of upstream data between the terminal 54 and the communications controller 66 is preferably implemented using a conventional time division multiple access (TDMA) scheme in which the data is broken down into packets that are multiplexed into slots in the upstream channels 22. To implement a TDMA scheme, a synchronization or clocking signal known as a TDMA framing signal is required to synchronize transmission of the data packets. In the preferred embodiment of the present invention, the TDMA framing signal for each of the upstream channels 22 is conveniently obtained from the vertical synchronization signal which is present in the television signals on the downstream channels 20. Thus, the terminal processor 96 is preferably programmed for detecting the vertical synchronization signal in the downstream data received from the data extractor 92 or the decoding and decompression module 98, and generating a TDMA framing signal that is fed to the upstream transmitter 106. The TDMA framing signal enables the upstream transmitter 106 to send its data packets through the upstream channel 22 at the appropriate time to insure that the data will not interfere with upstream data from the other ones of the transmitters 54 which are transmitting on the same upstream channel 22. Use of the vertical synchronization signal in this manner to generate the upstream TDMA framing signal thereby eliminates the need to generate a separate clocking signal, and insures that the upstream data transmissions from the terminals 54 will be synchronized with each other.

Figure 2B:
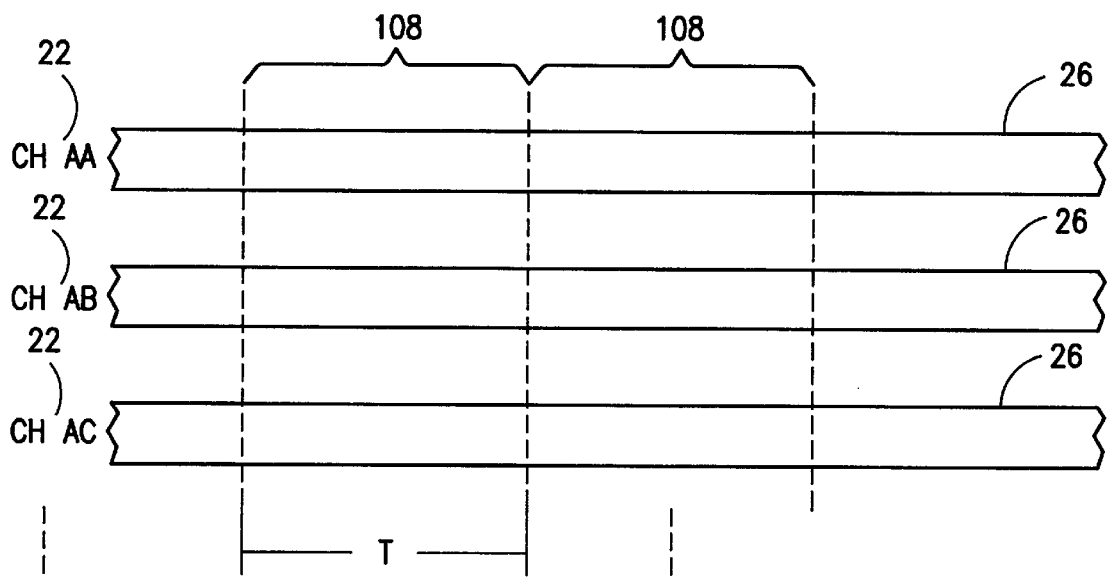

The transmission of upstream and downstream data between the terminal 54 and the communications controller 66 of the headend server 38 will now be described in greater detail with reference to FIGS. 7–10F. Preferably, each upstream channel 22 of the television distribution network 12 is multiplexed into a plurality of upstream slots 108, as illustrated in FIG. 2B, where the temporal length T of each slot 108 is equal to the temporal length T of picture field 28, as illustrated in FIG. 2A. Also, a plurality of the upstream channels 22 is preferably paired with each downstream channel 20. In the preferred embodiment of the present invention, up to four upstream channels 22 are paired with each downstream channel 20. Also, each terminal 54 on the system 10 is preferably assigned to at least one of the upstream slots 108 at any one time.

Figure 7:
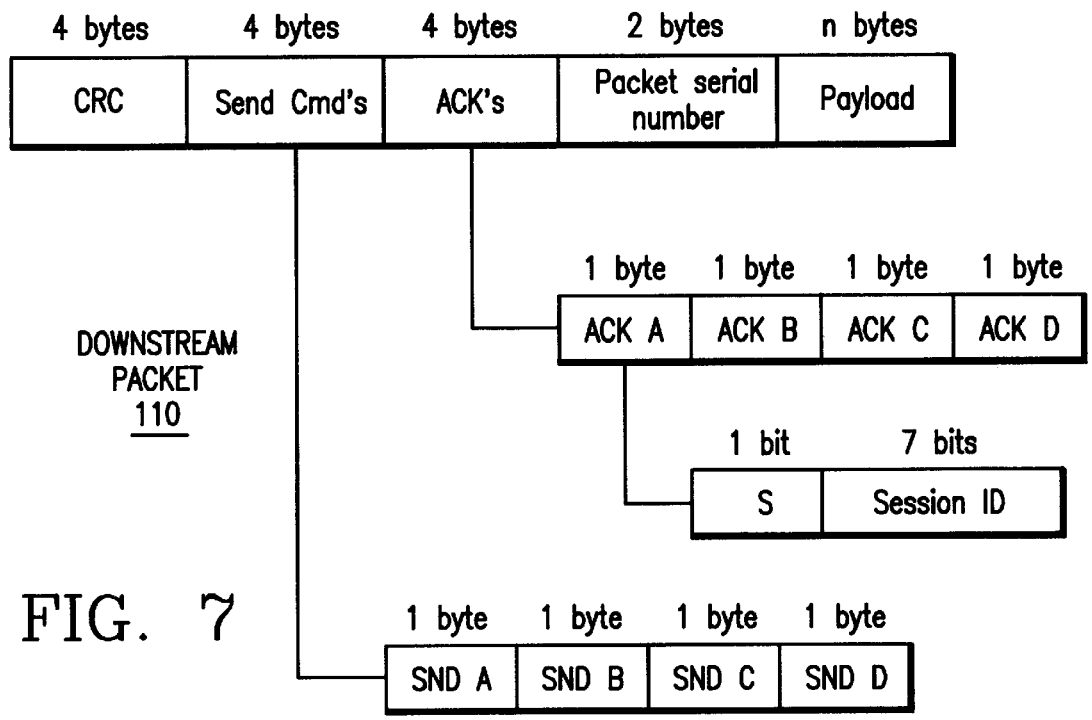
FIG. 7 is a diagram of a downstream packet transmitted on one of the downstream channels shown in FIG. 2A.

Referring now to FIG. 7, each transmission of downstream data from the communications controller 66 of the headend server 38 is preferably in the form of at least one downstream packet 110. As illustrated in FIG. 7, the downstream packet 110 includes a four-byte cyclical redundancy check (CRC) value based on the rest of the downstream packet 110, where the CRC value is employed to detect any corruption of the data in the packet 110. The use of CRC values is well-known and, therefore, need not be further described.

The downstream packet 110 also includes four SND bytes (SND A–SND D), where each SND byte corresponds to an upstream channel 22 associated with the downstream channel 20 on which the downstream packet 110 is being sent. Each SND byte contains a session ID of a sender (i.e., a terminal 54) that is allowed to transmit upstream data in the next upstream slot 108 of the corresponding upstream channel 22. For example, if the SND B byte has a value of '1', then the terminal 54 assigned the session ID '1' may transmit in the next upstream slot 108 on the upstream channel 22 that corresponds to 'B'. Preferably, if a particular SND byte has a value of zero, any terminal 54 is allowed to transmit in the next corresponding upstream slot 108, for example, to request a new session.

Each downstream packet 110 also has four acknowledgment (ACK A–ACK D) bytes, where each ACK byte corresponds to an upstream channel 22 associated with the downstream channel 20 on which the downstream packet 110 is being sent. As should be understood, each ACK byte is sent in response to the successful receipt of upstream data on a respective upstream channel 22 in the previous upstream slot 108. Preferably, each ACK byte includes the session ID of the transmitting terminal 54 and a check bit indicating whether the serial number of the upstream packet being acknowledged was an even or an odd number.

Figure 8A:
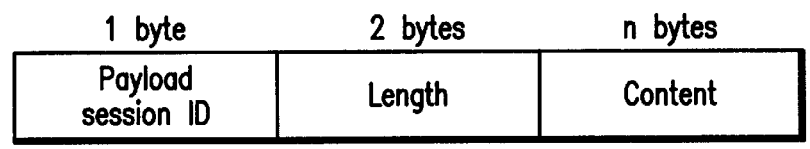
FIGS. 8A–8B are diagrams of payloads that can be sent in the downstream packet shown in FIG. 7.

The downstream packet 110 also has a two-byte packet serial number, followed by a multi-byte payload. Referring now to FIG. 8A, it is illustrated that a downstream data payload 112 includes a one-byte payload session ID for identifying the session ID of the intended receiving terminal 54 for the payload, a two-byte length indicator, and the contents of the data being sent in the packet. As should be understood, although all terminals 54 on the downstream channel 20 will receive all downstream packets 110, a particular terminal 54 will ignore the contents of the data being sent in the packet 110 unless the data payload 112 has a payload session ID corresponding to the session ID of the terminal 54.

Figure 8B:
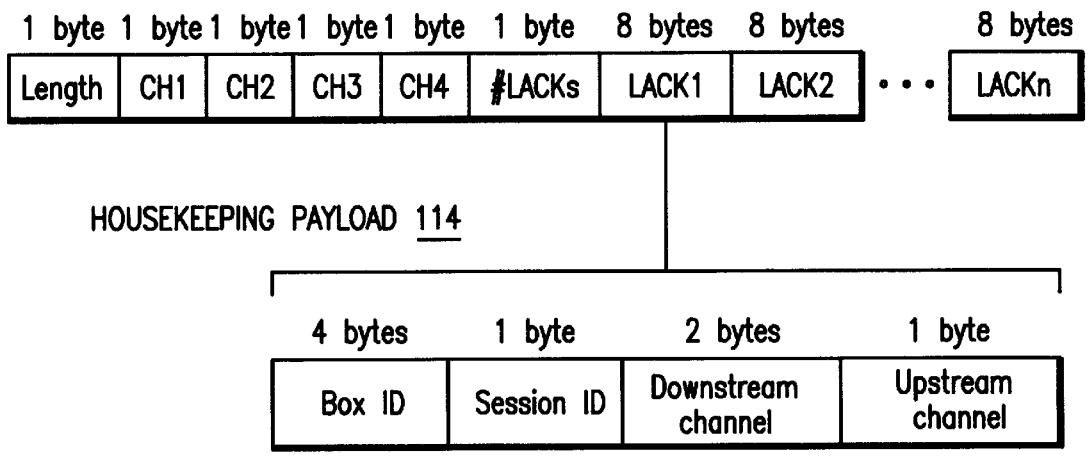

Preferably, a downstream packet 110 periodically has a housekeeping payload 114 rather than a data payload 112, as illustrated in FIG. 8B. As illustrated, the housekeeping payload 114 includes four channel bytes, each channel byte identifying a respective one of the four upstream channels 22 associated with the downstream channel 20 on which the downstream packet 110 is being sent. Accordingly, if a terminal 54 wishes to initiate a session on the access system 10, the terminal 54 must listen on the downstream channel 20 for a housekeeping packet 114, and upon receipt of such housekeeping packet can determine what upstream channels 22 are associated with the downstream channel 20. The terminal 54 can then send a session request on one of the associated upstream channels 22.

If session requests were recently made and acted upon by the communications controller 66, the housekeeping payload 114 also includes a number of session request (log-in) acknowledgments (LACKs). In particular, the housekeeping payload 114 includes a one-byte indicator of the number of LACKs, followed by each LACK. As illustrated, each LACK includes a 'box ID' corresponding to a unique terminal ID number associated with a requesting terminal 54, a one-byte session ID that identifies the requesting terminal 54 during the session, a two-byte downstream channel indicator indicating the downstream channel 20 the requesting terminal 54 should tune in to, and a one-byte upstream channel indicator indicating the upstream channel 22 the terminal 54 should be broadcasting on.

Figure 9:
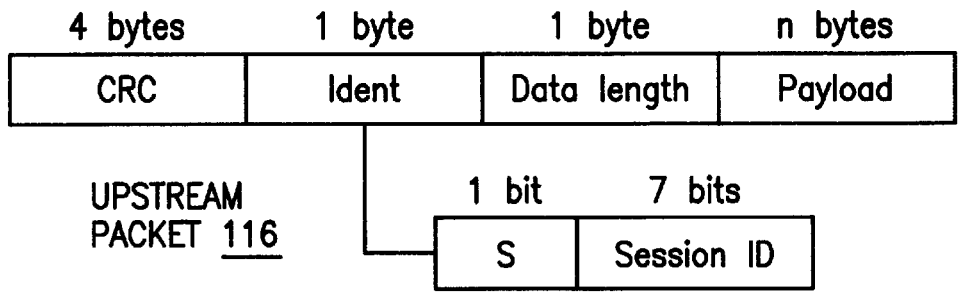
FIG. 9 is a diagram of an upstream packet transmitted on one of the upstream channels shown in FIG. 2B.
Figure 10A:
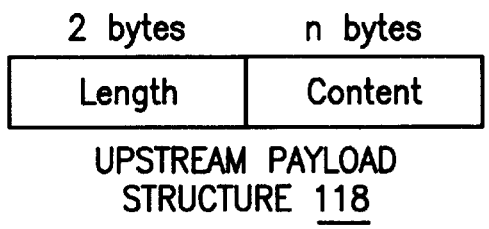
FIGS. 10A–10F are diagrams of payloads that can be sent be sent in the upstream packet shown in FIG. 9.

Referring now to FIG. 9, upstream data from the terminal 54 is sent in the form of an upstream packet 116. As illustrated, each upstream packet 116 includes a 4-byte CRC value, as with each downstream packet 110, a one-byte identifier which has the session ID assigned to the terminal 54 and a check bit indicating whether the upstream packet 110 has an even or an odd packet number, a one-byte data length indicator indicating the length of a multi-byte upstream payload in the packet 116, and the payload. As illustrated in FIG. 10A, the upstream payload has a structure 118 that includes a two-byte length indicator and the contents of the payload. FIGS. 10B–10F are examples of the contents of various upstream payloads.

Figure 10B:
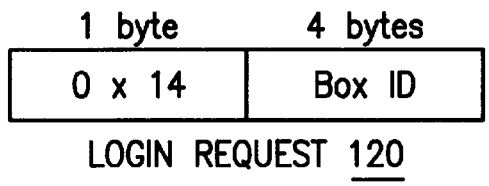
Figure 10C:
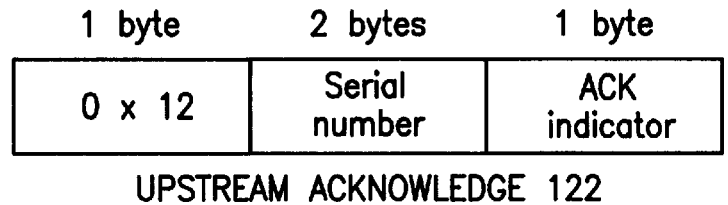

As illustrated in FIG. 10B, a session or log-in request 120 from a terminal 54 includes a one-byte indicator signifying that the upstream packet 116 is a log-in request 120 and the unique box ID of the requesting terminal 54. As illustrated in FIG. 10C, an upstream acknowledge payload 122 includes a one-byte indicator signifying that the upstream packet 116 is an upstream acknowledge 122, a two-byte serial number of the downstream packet 110 that is being acknowledged, and a one-byte acknowledge (ACK) indicator.

Figure 10D:
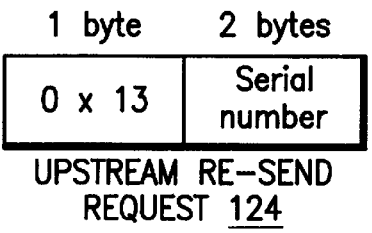

On occasion, an expected downstream data packet 110 is not received, or else is received with a corruption or error. Accordingly, and as illustrated in FIG. 10D, an upstream packet 116 may have an upstream re-send request payload 124 which includes a one-byte indicator signifying that the upstream packet 116 is an resend request 124, and a two-byte serial number of the downstream packet 110 that must be re-sent.

Figure 10E:
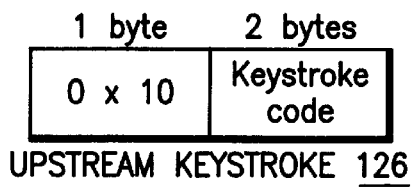

If the data being sent upstream by the terminal 54 is a keystroke from a computer-style keyboard 58 or other input device 58, then the upstream packet 116 has an upstream keystroke payload 126, as illustrated in FIG. 10E, which includes a one-byte indicator signifying that the upstream packet 116 is a keystroke payload 126, and a two-byte keystroke code. As should be understood, if the keystroke is from a keyboard 58, the keystroke code includes information on whether a CTRL/ALT/SHIFT key is being pressed at the time a key is struck.

Figure 10F:
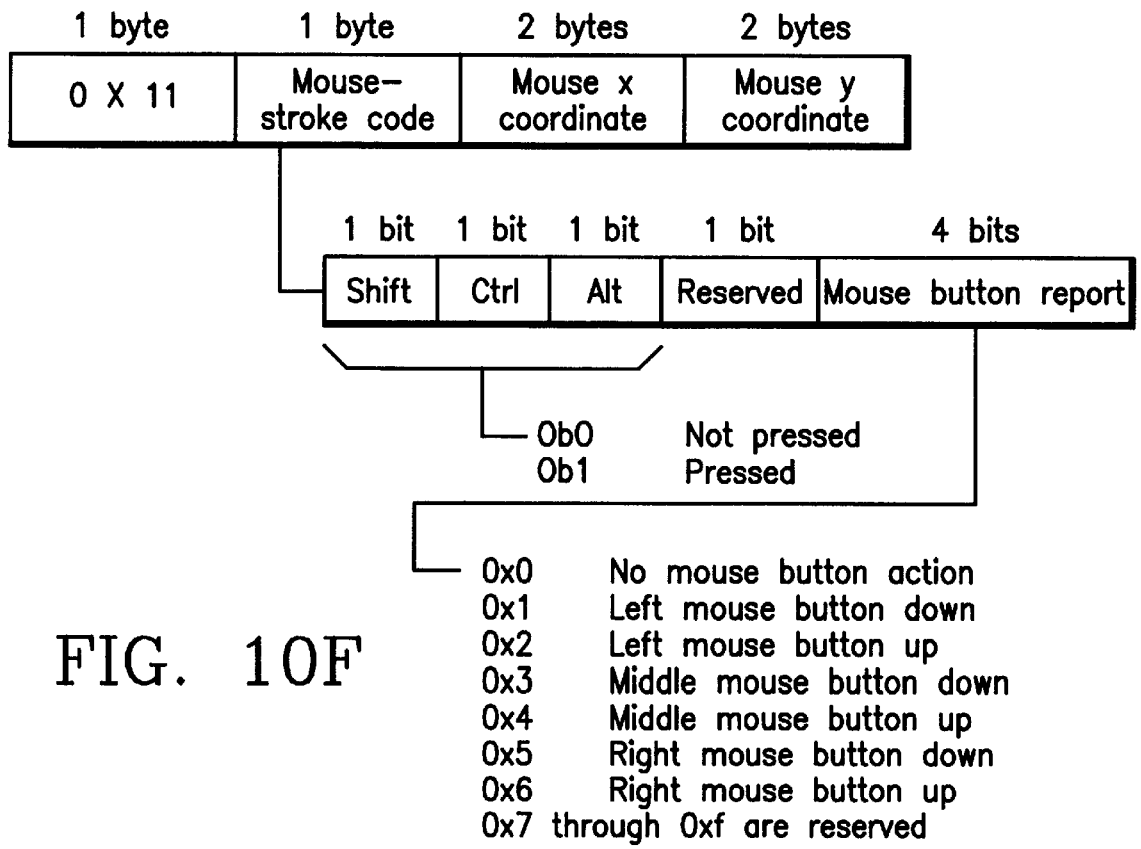

As discussed previously, the input device 58 preferably includes a mouse or mouse-like device, and mouse movements are input to the terminal 54 and the access system 10 as commands. Accordingly, an upstream packet 116 may include upstream mouse movement information 128, as illustrated in FIG. 10F. The mouse movement information 128 includes a one-byte indicator signifying that the upstream packet 116 is a mouse movement payload 128, a one-byte mouse-stroke code, a two-byte mouse X-coordinate, and a two-byte mouse Y-coordinate. As should be understood, the one-byte mouse-stroke code includes information on whether a SHIFT/CTRL/ALT key is being pressed, and left, middle, and right mouse button information.

As one skilled in the art will readily appreciate, the particular structures of the downstream and upstream packets 110, 116 may be changed without departing from the spirit and scope of the present invention. For example, if only three upstream channels 22 are assigned to a downstream channel 20, only three SND and three ACK bytes are necessary in the downstream packet 110 (FIG. 7). Similarly, fields in the packets 110, 116 may be added, deleted, or changed in terms of structure or size.

With the access system 10 as described above, a terminal 54 requests a session in the following manner. Preliminarily, the terminal 54 is tuned-in to a downstream channel 20 on which downstream packets 110 are being sent, and listens for a housekeeping packet 114 (as illustrated in FIG. 8B) to determine which upstream channels 22 are associated with the downstream channel 20. A random one of the upstream channels 22 is selected, and a log-in request 120 (FIG. 10B) is sent in an upstream slot 108 that has not been preassigned by a respective SND byte (as illustrated in FIG. 7). If a log-in acknowledge (LACK) (FIG. 8B), is subsequently received within a pre-determined number of time periods T (corresponding to the length of a picture field 28 (FIG. 2A) and to the length of an upstream slot (FIG. 2B)), the session request is successful. If not, a new random downstream and upstream channel 20, 22 may be tried.

In the unlikely event that two terminals 54 send a session request in the same upstream slot 108, the communications controller 66 will receive collided data and neither terminal 54 will receive a LACK. Preferably, each terminal 54 then waits a random amount of time and attempts a second session request. The process is repeated until both session requests are handled by the communications controller 66.

Once logged in, and after the terminal 54 issues an upstream command, the terminal waits for a downstream packet 110 that has been addressed to the terminal 54 in response to the command. Preferably, each received downstream packet 110 is checked to determine if the packet serial number is correct. If the packet serial number is wrong, a re-send request 124 (FIG. 10D) is sent with the packet serial number of the last packet that was successfully received. Preferably, the headend server 38 interprets a re-send request 124 as a request to re-send the packet 110 having the re-send serial number and every packet 110 sent thereafter.

If a re-send request 124 is sent multiple times without result, or if a downstream packet 110 has not been received by the terminal 54 in a predetermined period of time, the terminal 54 can attempt a re-connect. Preferably, in a re-connect attempt, the terminal makes a session request 120 on a new downstream and upstream channel 20, 22.

As was discussed above, each downstream packet 110 and upstream packet 116 is quickly acknowledged (ACKed) by the packet recipient, as illustrated in FIGS. 7 and 10C. As should be understood, such quick ACKs are necessary to address the problem of noise (as was discussed above) and to provide real-time access to the ISP 60. Preferably, a packet sender waits for up to two upstream slots 108 or picture fields 28 to receive an ACK from a packet recipient. If an ACK is not received in this time by a terminal 54, the terminal 54 preferably re-sends the upstream packet 116 for which acknowledgment is sought. If a terminal 54 is forced to re-send data a predetermined number of times, a re-connect attempt is preferably made on new downstream and upstream channels 20, 22.

It is preferable that the following method be employed to send commands and receive information in the access system 10 as described above. In the method, and referring now to FIG. 11, first data is input for the headend server 38 into one of the terminals 54 (step S1101), and is transmitted from the terminal 54 on an upstream channel 22 of the distribution network 12 (step S1102). The transmitted first data is then received on the upstream channel 22 of the distribution network 12 at communications controller 66 of the headend server 38 (step S1103), and a first acknowledgment (ACK) of the received first data is transmitted from the headend server 38 on a downstream channel 20 of the distribution network 12 (S1104). The transmitted first ACK is then received on the downstream channel of the distribution network 12 at the terminal 54 (step S1105) to indicate that the inputted first data was successfully received. Preferably, the first ACK is received by the terminal 54 within about two picture fields 28 or upstream slots 108 (2T).

Figure 11:
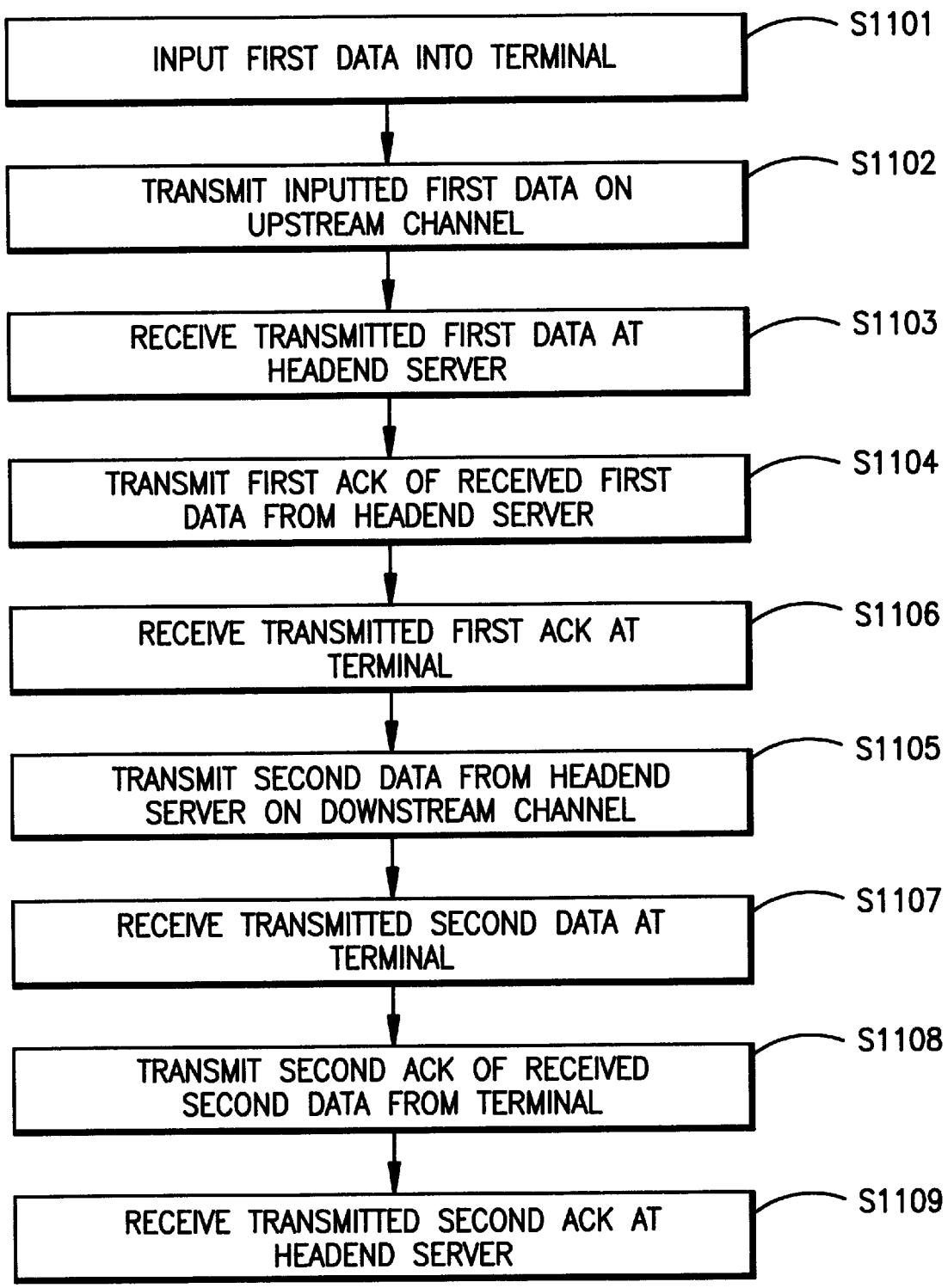
FIG. 11 is a flow diagram showing the acknowledgment process performed in the preferred embodiment of the present invention.

In the method shown in FIG. 11, second data is also transmitted from the communications controller 66 of the headend server 38 on a downstream channel 20 of the distribution network 12 (step S1106) and is received by the terminal 54 (S1107). In response, the terminal 54 transmits a second ACK of the received second data on an upstream channel 22 of the distribution network 12 (step S1108), and the transmitted second ACK is received by the headend server 38 (step S1109) to indicate that the second data was successfully received by the terminal 54.

As should be understood, and as was previously described, each transmitting step on a downstream channel 20 in the real-time acknowledgment method described above includes the step of inserting sequential portions of information (i.e. the second data or the first ACK) into the blank intervals 32 of sequential picture fields 28 of at least one of the television transmissions 24 and each of the receiving steps on a downstream channel 20 includes the step of extracting the inserted sequential portions of the information from the blank intervals 32 of the sequential picture fields 28 of the television transmissions 24.

In summary, the present invention comprises a new and useful access system and method for accessing information from a remote information source. The access system is particularly useful since it takes advantage of an already-existing networked distribution system, since a user of the access system need not invest substantial resources in personal computers, modems and the like, since a user need not be technically sophisticated, and since a user need not tie up a telephone line to obtain such information. Moreover, the equivalent baud rate of such an access system is significantly higher than that available from a conventional 28.8K baud rate telephone modem.

It will be appreciated by those skilled in the art that changes could be made to the embodiment described above without departing from the broad inventive concepts thereof.

For example, and has already been mentioned previously, although the preferred embodiment of the invention is implement by inserting information from the ISP 60 or other information source into the vertical blanking interval of a conventional analog television signal, it should be understood that the invention could also be implemented by using an all digital encoding format, such as MPEG II, for example. In addition, it may be appreciated that a personal computer could be interfaced to the terminal 54 to provide enhanced access while still being within the spirit and scope of the present invention. Still further, although the preferred embodiment employs a television distribution system, the present invention can be implemented using any networked distribution system, such as a radio broadcasting network, pager network, etc. It is understood, therefore, that this invention is not limited to the particular embodiment disclosed but is intended to cover modifications within the spirit and scope of the present invention as defined by the appended claims.

We claim:

1. An access system for providing interactive access to an information source through a networked distribution system comprising:
   a) a distribution network including a network headend, a plurality of terminal ends, a plurality of downstream channels connected between said network headend and said terminal ends, and a plurality of upstream channels connected between said network headend and said terminal ends;
   b) a plurality of transmitters connected, one each, to corresponding ones of said terminal ends, for transmitting commands through said upstream channels to said network headend requesting information from said information source, each said command including an identification code identifying the one of said terminals sending the command; and
   c) a server interfaced between said network headend and said information source, said server having an Internet Protocol address assigned thereto for facilitating communication with said information source; and including means for sending an information request to said information source in response to a command from one of said terminals, receiving said requested information from said information source, identifying from said identification code, the one of said terminals which sent said command, and downloading said requested information through said network headend and one of said downstream channels to said one of said terminals.

2. The system of claim 1, wherein said server further includes:
   1) a plurality of browser applications for concurrent use by a corresponding number of said terminals;
   2) means for maintaining a number of said browser applications in an active state, wherein said number exceeds the number of said browser applications currently being used by said terminals; and
   3) means for connecting one of said terminals to one of said active browsers when an access command is received by said server from said one of said terminals.

3. The system of claim 2, wherein said means for maintaining further comprises means for monitoring the number of available active browser applications, and means for activating additional browser applications when said number of available active browser applications drops below a predetermined number.

4. The system of claim 1, wherein said upstream channels are time division multiplexed, with data for said upstream channels being inserted as packets in said upstream channels.

5. The system of claim 4, wherein said downstream channels carry television signals from said network headend, said signals including a vertical synchronization signal; and means are provided for employing said vertical synchronization signal to generate a framing signal for data on said upstream channels.

6. The system of claim 1, wherein said distribution network comprises a television distribution network, said information source comprises the Internet, and said server is interfaced to an Internet Service Provider.

7. The system of claim 6, wherein said television distribution network further comprises a cable television distribution network.

8. An access system for providing interactive access to an information source through a networked distribution system comprising:
   a) a distribution network including a network headend, a plurality of terminal ends, a plurality of downstream channels connected between said network headend and said terminal ends, and a plurality of upstream channels connected between said network headend and said terminal ends;
   b) a plurality of transmitters connected, one each, to corresponding ones of said terminal ends, for transmitting commands through said upstream channels to said network headend requesting information from said information source; and
   c) a server interfaced between said network headend and said information source, said server including:
      1) a plurality of browser applications for concurrent use by a corresponding number of said terminals;
      2) means for maintaining a number of said browser applications in an active state, wherein said number exceeds the number of said browser applications currently being used by said terminals; and
      3) means for connecting one of said terminals to one of said active browsers when an access command is received by said server from said one of said terminals.

9. The system of claim 8, wherein said means for maintaining further comprises means for monitoring the number of available active browser applications, and means for activating additional browser applications when said number of available active browser applications drops below a predetermined number.

10. The system of claim 8, wherein said upstream channels are time division multiplexed, with data for said upstream channels being inserted as packets in said upstream channels.

11. The system of claim 10, wherein said downstream channels carry television signals from said network headend, said signals including a vertical synchronization signal; and means are provided for employing said vertical synchronization signal to generate a framing signal for data on said upstream channels.

12. The system of claim 8, wherein said distribution network comprises a television distribution network, said information source comprises the Internet, and said server is interfaced to an Internet Service Provider.

13. The system of claim 12, wherein said television distribution network further comprises a cable television distribution network.

14. A method for providing interactive access to an information source through a television distribution system comprising the steps of:
   a) providing a television distribution network including a network headend, a plurality of terminal ends, a plurality of downstream channels connected between said network headend and said terminal ends, and a plurality of upstream channels connected between said network headend and said terminal ends;

b) providing a plurality of transmitters connected, one each, to corresponding ones of said terminal ends;

c) providing a server interfaced between said network headend and said information source, said server having an Internet Protocol address assigned thereto for facilitating communication with said information source;

d) transmitting a command from one of said terminals through one of said upstream channels to said network headend, said command requesting information from said information source and including an identification code identifying the one of said terminals sending the command;

e) forwarding said command to said server;

f) sending an information request from said server to said information source in response to said command;

g) sending requested information from said information source to said server;

h) identifying from said identification code the one of said terminals which sent said command; and i) downloading said requested information from said server through said network headend and one of said downstream channels to said one of said terminals.

15. The method of claim 14, further comprising the steps of:

j) causing said server to activate a plurality of Internet browser applications for concurrent use by a corresponding number of said terminals; and k) connecting said one of said terminals to one of said active browser applications when said command is received by said server from said one of said terminals.

16. The method of claim 15, further comprising the steps of:

l) causing said server to monitor the number of said available active browsers not currently connected to one of said terminals; and m) causing said server to activate additional browser applications when the number of active browser applications drops below a predetermined number.

17. The method of claim 14, wherein said step of transmitting a command from one of said terminals through one of said upstream channels to said network headend further comprises:

1) forming said command as at least one data packet; and 2) inserting said at least one data packet in at least one corresponding slot in said upstream channel.

18. The method of claim 17, further comprising the step of:

3) employing a vertical synchronization signal in a television signal transmitted through one of said downstream channels as a framing signal for transmitting said at least one packet to said network headend.

19. The method of claim 14, wherein said step of providing a distribution network further comprises providing a television distribution network, and said step of sending an information request from said server to said information source further comprises sending an information request from said server to an Internet Service Provider, and forwarding said request from said Internet Service Provider to the Internet.

20. The method of claim 19, wherein said step of providing a television distribution network further comprises providing a cable television distribution network.

21. A method for providing interactive access to an information source through a television distribution system comprising the steps of:

a) providing a television distribution network including a network headend, a plurality of terminal ends, a plurality of downstream channels connected between said network headend and said terminal ends, and a plurality of upstream channels connected between said network headend and said terminal ends;

b) providing a plurality of transmitters connected, one each, to corresponding ones of said terminal ends;

c) providing a server interfaced between said network headend and said information source, said server controlling activation of a plurality of browser applications;

d) causing said server to activate a plurality of said browser applications;

e) transmitting a command from one of said terminals through one of said upstream channels to said network headend, said command requesting information from said information source;

f) forwarding said command to said server;

g) connecting said one of said terminals to one of said active browser applications, and sending an information request from said server to said information source in response to said command;

h) sending requested information from said information source to said server; and i) downloading said requested information from said server through said network headend in one of said downstream channels to said one of said terminals.

22. The method of claim 21, further comprising the steps of:

l) causing said server to monitor the number of said available active browsers not currently connected to one of said terminals; and m) causing said server to activate additional browser applications when the number of active browser applications drops below a predetermined number.

23. The method of claim 21, wherein said step of transmitting a command from one of said terminals through one of said upstream channels to said network headend further comprises:

1) forming said command as at least one data packet; and 2) inserting said at least one data packet in at least one corresponding slot in said upstream channel.

24. The method of claim 23, further comprising the step of:

3) employing a vertical synchronization signal in a television signal transmitted through one of said downstream channels as a framing signal for transmitting said at least one packet to said network headend.

25. The method of claim 23, further comprising the step of:

3) repeatedly sending said at least one data packet to said network headend until an acknowledgment is received from said network headend that said at least one packet has been received.

* * * * *